ns Cited 188/72.5

United States Patent [19]
Johnson

[11] 4,335,808
[45] Jun. 22, 1982

[54] MULTIPLE BISCUIT CLUTCH OR BRAKE

[75] Inventor: Earl R. Johnson, Tulsa, Okla.

[73] Assignee: Loffland Brothers Company, Tulsa, Okla.

[21] Appl. No.: 156,278

[22] Filed: Jun. 4, 1980

[51] Int. Cl.³ .................................... F16D 25/063
[52] U.S. Cl. ............................ 192/85 AB; 188/72.3; 188/72.5
[58] Field of Search ............ 192/85 AB, 85 A, 70.28; 188/71.3, 71.4, 72.3, 72.5, 368

[56] References Cited

U.S. PATENT DOCUMENTS

| | | | |
|---|---|---|---|
| 1,608,778 | 11/1926 | Dunwoodie | 192/85 AB |
| 2,174,400 | 9/1939 | McCone | 188/72.3 |
| 2,381,941 | 8/1945 | Wellman et al. | 188/71.4 |
| 2,563,673 | 8/1951 | Cardwell et al. | 192/85 AB |
| 2,938,609 | 5/1960 | Burnett | 188/71.4 |
| 3,421,604 | 1/1969 | Hobbs | 188/72.5 |
| 3,750,787 | 8/1973 | Link | 192/85 AB |

*Primary Examiner*—George H. Krizmanich
*Attorney, Agent, or Firm*—Head & Johnson

[57] ABSTRACT

A clutch or brake utilizing the principles of a disc brake and comprising an annular disc rotatably secured between a pair of normally stationary annular flanges, a plurality of back-to-back caliper pistons secured in the disc and circumferentially spaced therearound, a fluid chamber interposed between each of the back-to-back pistons and in communication with a source of fluid for alternate extension of the pistons into simultaneous engagement with the pair of flanges and retraction of the pistons from engagement therewith to provide selective control of the rotation of the disc for either a braking or clutch operation.

9 Claims, 6 Drawing Figures

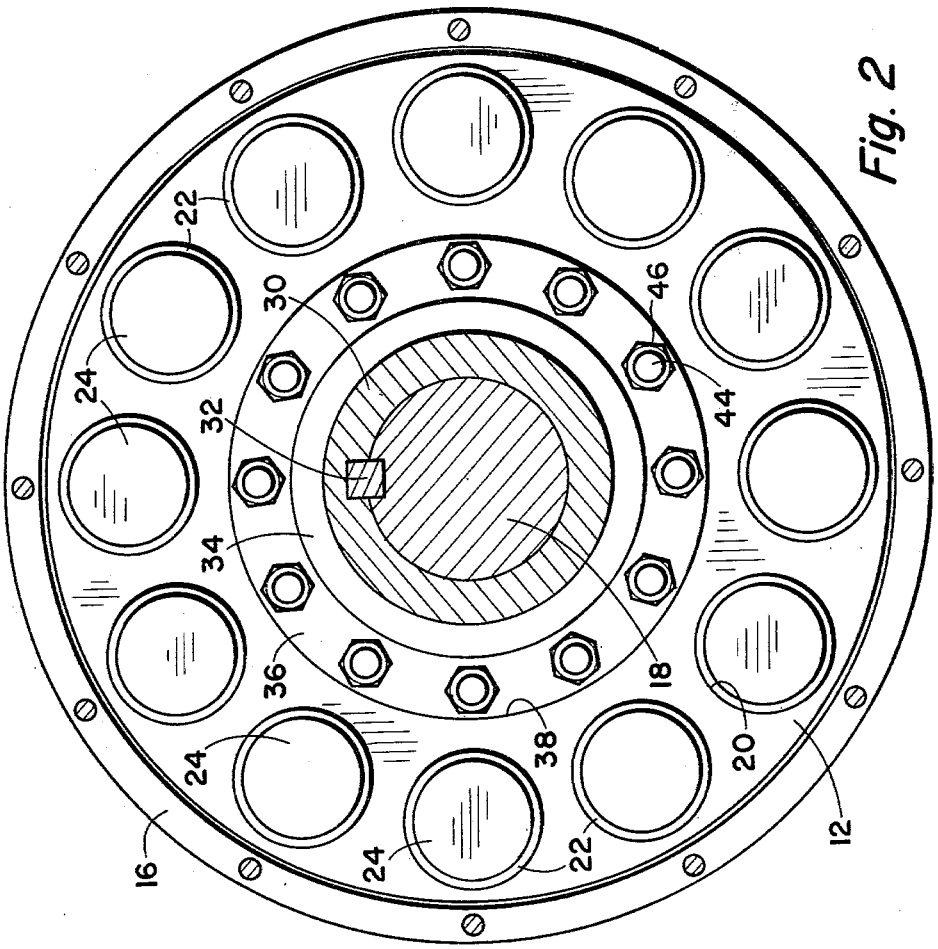
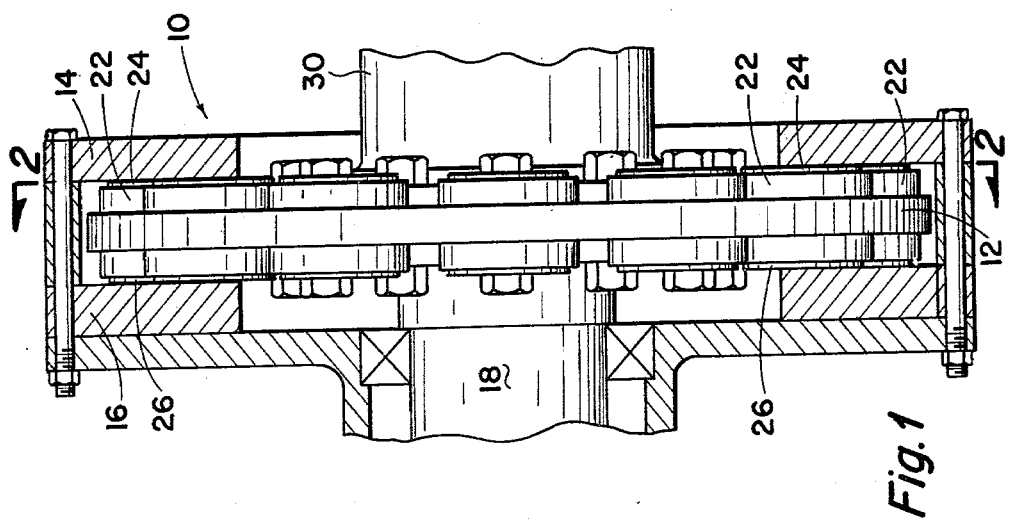

MULTIPLE BISCUIT CLUTCH OR BRAKE

BACKGROUND OF THE INVENTION

1. Field of the Invention

This invention relates to improvements in brake and clutch apparatus and more particularly, but not by way of limitation, to a disc brake type apparatus which may be utilized either for a braking operation or a clutch operation.

2. Description of the Prior Art

Disc braking apparatus has been developed largely from the aircraft industry wherein the tremendous forces necessary in the braking of large fast moving aircraft are usually to great for control by the earlier drum type braking systems. As a result of the improved results with disc brake installations, this type braking equipment is widely used in industrial installations wherein great braking forces are required, such as in the control of rotational speed of the wheels of large off-highway vehicles, the braking of cable spooling drums in many of the present day well bore drilling operation, and the like. These disc brake devices perform well, but have certain disadvantages in that a great amount of heat is usually developed during the braking action, and it is frequently difficult to efficiently dissipate the heat. In addition, the braking pistons are usually carried by brake caliper devices spaced outboard of the brake disc, and this usually requires a considerable amount of space for the installation of the braking apparatus.

SUMMARY OF THE INVENTION

The present invention contemplates a novel disc-brake type apparatus which may be utilized for either a braking operation or a clutch operation, and comprises the usual rotatable annular disc interposed between a pair of annular flanges which, in the case of a braking operation, are held stationary, but in the case of a clutching operation are normally stationary but may be rotated simultaneously with the annular disc when in an engaged condition. The disc is provided with a plurality of circumferentially spaced apertures, each aperture having a pair of back-to-back caliper pistons secured therein. A fluid chamber is interposed between the back-to-back pistons, and is in communication with a source of suitable pressure fluid, such as air, hydraulic fluid, or the like, for selective extension of the pistons into a gripping engagement with the inboard faces of the flanges to provide either the braking action or clutch action, and an alternate retracted position for disengagement of the pistons with respect to the flanges in order to release the braking action or clutching operation. The flanges are disposed outboard of the annular disc, thus the heat dissipation during operation of the apparatus is greatly enhanced. In addition, the installation of the pistons in the disc itself provides a minimum profile or overall size for the apparatus, thus greatly reducing the space require for installation of the apparatus. The novel multiple biscuit brake or clutch apparatus is simple and efficient in operation and economical and durable in construction.

BRIEF DESCRIPTION OF THE DRAWINGS

FIG. 1 is a sectional elevational view of a multiple biscuit brake or clutch apparatus embodying the invention, with portions shown in elevation for purposes of illustration.

FIG. 2 is a view taken on line 2—2 of FIG. 1.

DETAILED DESCRIPTION OF THE PREFERRED EMBODIMENT

Figure 3:
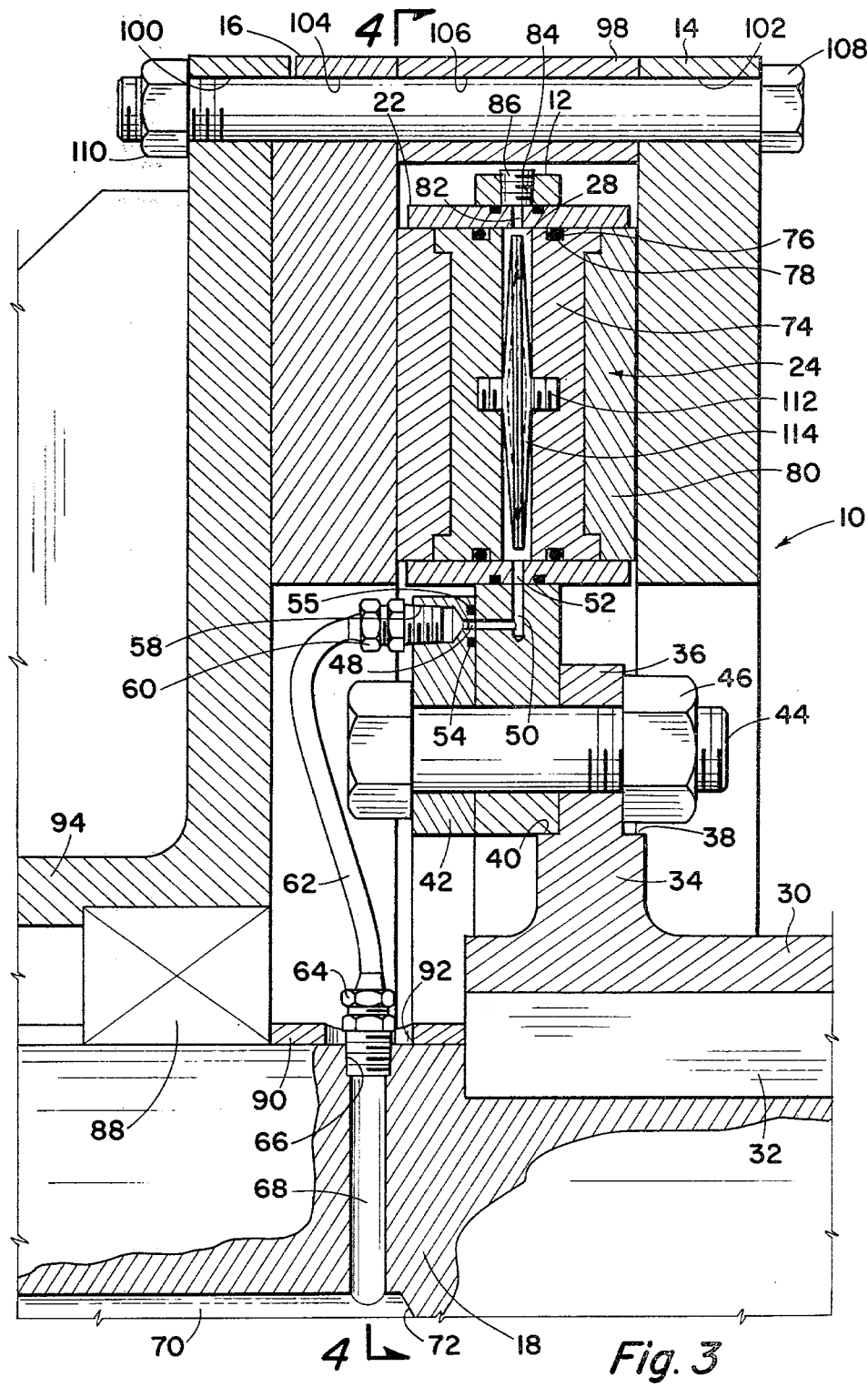
FIG. 3 is an enlarged sectional elevational view of a half section of a multiple biscuit brake or clutch apparatus embodying the invention, and illustrates and engaged position for the apparatus.
Figure 4:
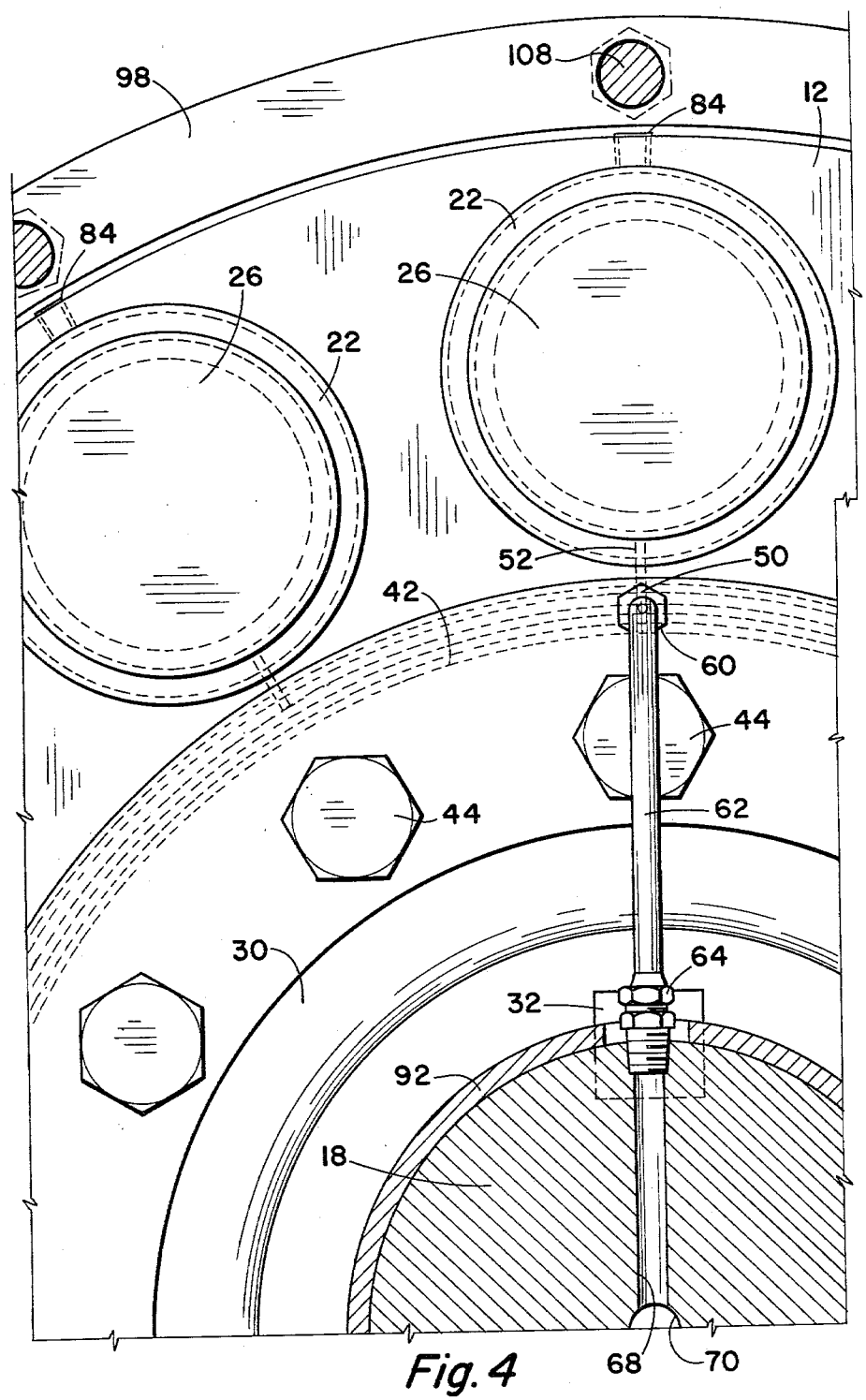
FIG. 4 is a view taken on line 4—4 of FIG. 3.

Referring to the drawings in detail, reference character 10 generally indicates a multiple biscuit brake or clutch apparatus comprising an annular disc member 12 interposed between a pair of substantially identical annular flanges 14 and 16. The disc 12 is secured to a rotatable shaft 18 in a manner as will be hereinafter set forth and for rotation simultaneously therewith. The flanges 14 and 16 are supported by the shaft 18 in a manner as will be hereinafter set forth whereby the flanges 14 and 16 are normally stationary with respect to the disc 12. A plurality of bores or apertures 20 are circumferentially spaced around the disc 12, and a cylindrical sleeve 22 is welded or otherwise rigidly secured in each of the bores 20. The longitudinal axis of each sleeve 22 extends substantially perpendicularly with respect to the plane of the disc 12, and a pair of oppositely disposed or back-to-back substantially identical pistons 24 and 26 are slidably secured within each sleeve 22 for a purpose as will be hereinafter set forth. A hiatus or chamber 28 is interposed between each pair of oppositely disposed pistons 24 and 26 and is in communication with a source of fluid, such as air, hydraulic fluid, or the like, in a manner as will hereinafter set forth. The application of fluid pressure in the chamber 28 creates a force against the inboard faces of each piston 24 and 26 for extending the pistons axially outwardly within the respective sleeve 22 whereby the outboard faces of the pistons will engage the respective flanges 14 and 16. Conversely, withdrawal of the pressure fluid from the chamber 28 creates a vacuum or reduced pressure condition within the chamber 28 whereby the pistons 24 and 26 are retracted within the respective sleeve 22, thus disengaging the outboard faces of the pistons from the flanges 14 and 16.

The shaft 18 may be the rotatable operating shaft for substantially any desired equipment with which the apparatus 10 is to be utilized, and is rotated about its own longitudinal axis in any suitable or well known manner (not shown). A hub member 30 is disposed concentrically around the outer periphery of the shaft 18 and is secured thereto in any suitable manner, such as by key means 32, whereby the hub 30 rotates simultaneously with the shaft 18. A circumferential flange 34 (FIG. 3) extends radially outwardly from the outer periphery of the hub 30 and is provided with a reduced width portion 36 forming oppositely disposed annular shoulders 38 and 40 on the opposite sides thereof. The inner periphery of the disc member 12 rests on the shoulder 40 and one face of the disc 12 bears against the inboard face of the reduced width portion 36. An annular ring 42 is disposed against the opposite face of the disc 12 and is secured thereagainst by a plurality of circumferentially spaced bolts 44 and complementary nuts 46. The bolts 44 extend through the ring 42, disc 12 and flange portion 36, thus securing the disc 12 to the hub 30 whereby the disc 12 may be rotated simultaneously with the shaft 18.

The inner diameter of the ring 42 is preferably substantially equal to the inner diameter of the disc 12, but not limited thereto, and the outer diameter of the ring 42 is preferably slightly less in dimension than the diametric dimension defined by the innermost circumferential portions of the sleeves 22, as will particularly be seen in FIG. 3. An annular recess 48 is provided on the inboard face of the ring 42 immediately adjacent the disc 12, and a plurality of substantially L-shaped passageways 50 are provided in the body of the disc 12, each passageway 50 having one end open to the annular recess 48. The opposite end of each passageway 50 is in communication with a radial bore 52 provided in each sleeve 22. In this manner each passageway 50 provides communication between the recess 48 and respective chamber 28 for directing a pressure fluid to and from the chambers 28 for a purpose as will be hereinafter set forth. Of course, it is preferable to provide suitable sealing members on the opposite sides of the recess 48 such as O-rings 54 and 55 and an O-ring 56 at the end of the passageway 50 for precluding leakage of fluid.

An inlet port 58 is provided in the ring 42 and extends from the outer face thereof into communication with the recess 48 for directing the pressure fluid thereto. The port 58 is preferably internally threaded for receiving a suitable fitting 60 therein. The fitting 60 is suitable secured to one end of a tube or conduit member 62 having a generally similar fitting 64 provided at the opposite end thereof for threaded connection with an outlet port 66 provided in the shaft 18. The outlet port 66 is in communication with a radially extending bore 68 which terminates at a centrally disposed longitudinally extending passageway 70 provided in the shaft 18. The passageway 70 is preferably closed at one end 72, and the opposite end thereof (not shown) is in communication with a source of pressure fluid, such as air, hydraulic fluid, or the like (not shown).

As hereinbefore set forth, each sleeve 22 houses or contains two substantially identical, oppositely disposed pistons 24 and 26 therein. The pistons 24 and 26 may be of any suitable or well known type such as commonly used in connection with the brake calipers in a disc braking system, and as shown herein comprises a substantially cylindrical main body portion 74 having a circumferential groove 76 extending around the outer periphery thereof for receiving an O-ring 78, or the like, therein. The O-ring 78 slides against the inner periphery of the sleeve 22 during reciprocation of the piston therein and precludes leakage of fluid therebetween. A substantially circular friction member 80 is secured to the outboard face of the body 74 in any suitable manner (not shown) for a purpose as will be hereinafter set forth. In addition, a second radial port 82 may be provided in the sleeve 22, preferably oppositely disposed with respect to the bore 56 but not limited thereto, and extends into communication with an access port 84 provided in the disc 12. A suitable plug member 86 may be threadedly secured to the access port 84 for closing thereof, as is well known.

Figure 5:
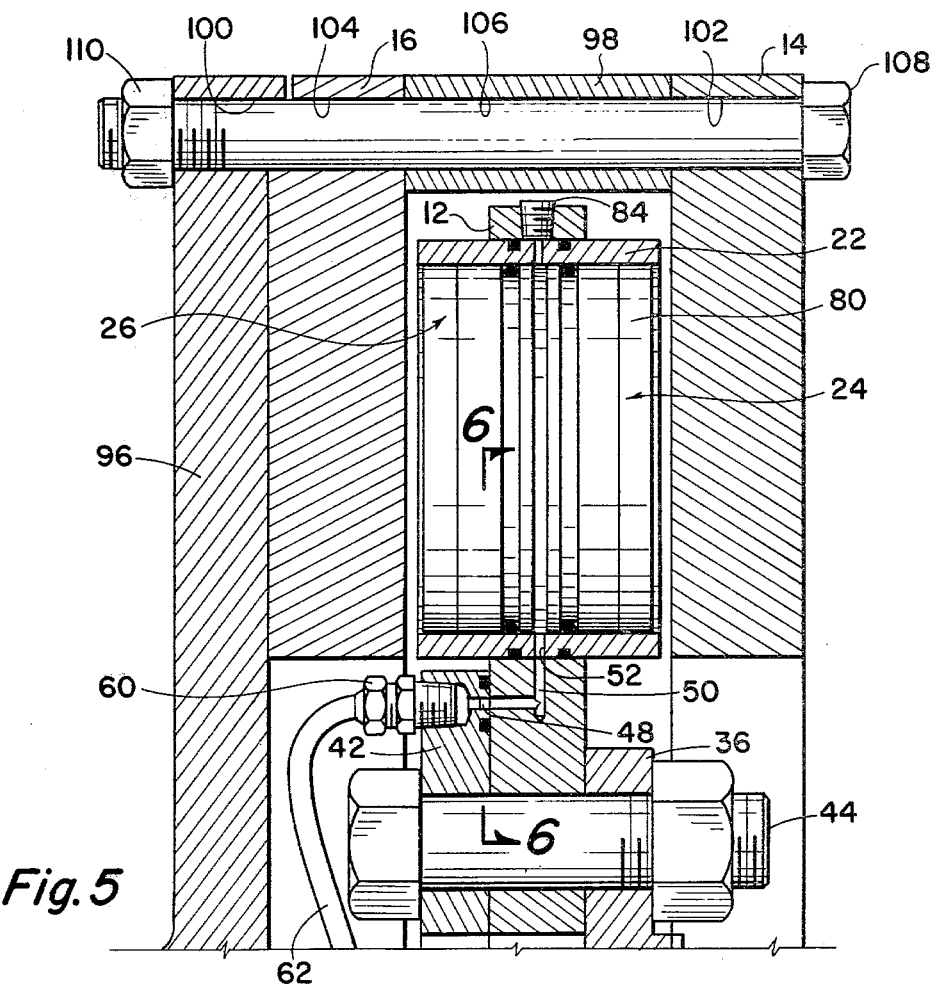
FIG. 5 is a sectional elevational view of a portion of a multiple biscuit brake or clutch apparatus embodying the invention and illustrates a disengaged position for the apparatus.
Figure 6:
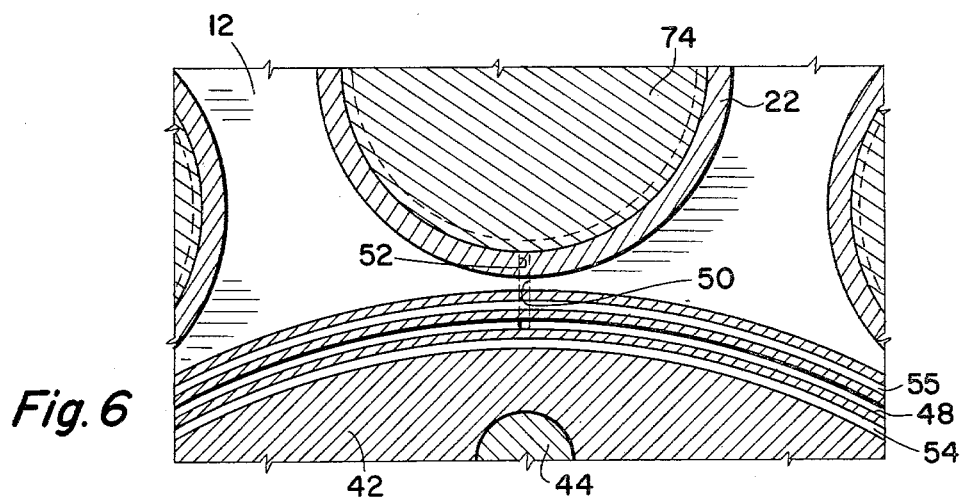
FIG. 6 is a view taken on line 6—6 of FIG. 5.

A suitable bearing 88 is disposed around the outer periphery of the shaft 18 and is spaced from the hub 30 by a suitable spacer sleeve 90 which is secured around the shaft 18 in any well known manner (not shown). The sleeve 90 is provided with a bore 92 in substantial alignment with the outlet port 66 for providing access thereto. The inner race (not shown) of the bearing 88 is supported on the shaft 18, and the outer race (not shown) thereof supports a sleeve 94 in concentric relation to the shaft 18. A circumferential flange 96 is provided around the outer periphery of one end of the sleeve 94 and extends outwardly therefrom. One of the annular flanges, such as the flange 16, is disposed in abutting relation with the outer face of the flange 96, and the annular flange 14 is spaced from the flange 16 by suitable spacer means, such as a cylindrical sleeve 98. The sleeve 98 preferably has an outer diameter substantially equal to the outer diameter of the annular flanges 14 and 16 and an inner diameter sufficiently large to provide clearance for the outer periphery of the disc 12. The outer diameter of the flange 96 is also preferably substantially equal to the outer diameter of the annular flanges 14 and 16, as shown in FIGS. 1, 3 and 5. The flange 96 is provided with a plurality of circumferentially spaced bores 100 disposed in axial alignment with a plurality of similar circumferentially spaced bores 102 and 104 provided in the annular flanges 14 and 16, respectively, and a plurality of similar circumferentially spaced bores 106 provided in the cylindrical spacer sleeve 98. The aligned bores 100, 102, 104 and 106 receive a suitable stud 108 therethrough which extends through the annular flanges 14 and 16, the flange 96 and the spacer sleeve 98 for securing the flanges 14 and 16 to the flange 96. A suitable nut 110 securely locks each of the bolts 108 in position within the aligned bores as is well known.

The sleeve 94 may be suitably secured to a stationary support element (not shown) or the like when the apparatus 10 is to be utilized for a braking operation wherein the rotation of the shaft 18 may be stopped by actuation of the device 10. Alternatively, the sleeve 94 may be suitably secured to a rotatable element (not shown) or the like when the apparatus 10 is to be utilized for a clutch operation wherein the rotation of the shaft 18 is to be transmitted to said rotatable element.

As particularly shown in FIG. 3, it may be desirable to provide a centrally disposed stud member 112 in the body 74 of each piston 24 and 26, with the outer end of each stud 112 extending into the chamber 28 between the related pairs of pistons. A bellows-type spring means 114 may be disposed in the chamber 28 and interposed between the pistons 24 and 26, with the normal position of the spring means 114 being collapsed or contracted. Each side of the spring means 114 is provided with a centrally disposed aperture (not shown) providing a lip for engagement with the respective stud 112 for connecting the bellows or spring means 114 with each of the pistons 24 and 26. In this manner, the spring means 114 constantly urges the pistons 24 and 26 in directions toward each other within their respective sleeve 22.

When the apparatus is to be utilized in a braking operation, the sleeve 94 may be suitably secured to any stationary support structure and the shaft 18 may be secured to any rotatable device which is to be controlled by the braking action of the apparatus 10. For example, the shaft 18 may be the axis of a cable spooling drum (not shown), and the stationary support structure may be a rigid portion of the draw works (not shown) utilized in a well bore drilling operation. During the rotation of the shaft 18 about its own longitudinal axis, the bearing 88 isolates the rotation from the sleeve 94 and flange 96. When it is desired to stop the rotation of the shaft 18, a suitable pressure fluid, such as air, hydraulic fluid, or the like, is directed through the longitudinal passageway 70 in any well known manner (not shown), and the fluid is directed through the radial passageway 68 to the conduit 62 and to the annular recess 54 of the ring 42. The fluid is distributed throughout the recess 54 and is thus simultaneously directed to each of the chambers 28 through the respective L-shaped passageways 50. The pressure within the chamber 28 acts on the inboard faces of each piston 24 and 26, and overcomes the force of the spring means 114 (providing the spring means is utilized) for urging the pistons 24 and 26 radially outwardly from opposite ends of the respective sleeve 22. This moves the friction elements 80 of each piston 24 and 26 into engagement with the inboard face of the flanges 14 and 16, and since the flanges 14 and 16 are held against rotational movement by the connection thereof with the flange 96, the rotation of the disc 12 will be stopped. The disc 12 is connected with the shaft 18 through the hub means 30, and thus the rotation of the shaft 18 will be stopped simultaneously with the ceasation of the rotation of the disc 12.

When the rotation of the shaft 18 is to be reinstated, the pressure fluid may be withdrawn from the chambers 28 whereupon the pistons 24 and 26 will retract to the normal position therefor within the respective sleeve 22, and out of engagement with the flanges 14 and 16. When the engagement of the friction elements 80 with the flanges 14 and 16 is released, the disc 12 is free to rotate independently of the flanges, and thus rotation of the disc 12 and shaft 18 may be resumed. The spring 114 may be desirable in order to release the engagement of the friction members 80 from the flanges 14 and 16 in any instance wherein the friction material of the members 80 may adhere slightly to the face of the flanges.

When the apparatus 10 is to be utilized in a clutch operation the sleeve 94 may be connected with a rotatable element (not shown) which is to be rotated intermittently with respect to the rotation of the shaft 18. In this instance, the pressure fluid is applied to the chambers 28 when it is desired to initiate rotation of intermittently rotatable element, and the application of fluid pressure to the chambers 28 as hereinbefore set forth causes the respective pistons 24 and 26 to move axially outwardly in opposite directions for bringing the friction elements 80 into engagement with the inboard faces of the annular flanges 14 and 16. With the elements 80 in frictional engagement with the flanges 14 and 16, the rotation of the disc 12 is transmitted to the sleeve 94, thus providing a clutching operation between the disc 12 and intermittently rotatable element. Of course, relief of the pressure from the chambers 28 permits the pistons 24 and 26 to retract axially to the normal disengaged position within the respective sleeve 22 whereby the disc 12 is freely rotatable independently of the sleeve 94.

Whereas the spacer sleeve 98 as described herein comprises a cylinder provided with a plurality of circumferentially spaced bores for receiving the studs 108 therethrough, it is to be noted that each of the studs 108 may extend through separate and individual spacer sleeves (not shown) if desired in lieu of a single cylindrical spacer element.

From the foregoing it will be apparent that the present invention provides a novel apparatus which may be utilized as either a braking device or clutch device. The novel apparatus utilizes the principles of disc brakes in a manner which reduces the space requirements for installation thereof, and greatly enhances the dissipation of heat during use thereof. The rotatable disc is disposed between a pair of annular flanges which may be connected with either a stationary support element or an intermittently rotatable element, depending upon whether the apparatus is to provide a braking action or clutching action. The rotatable disc carries a plurality of complementary pairs of extensible and retractable pistons which may be actuated for selective engagement with the outboard annular flanges. In the engaged position between the pistons and flanges, the movement between the flanges and disc is simultaneously on the flanges and disc coact. In other words, when the flanges are connected with a rotatable element, the disc and flanges rotate simultaneously in the engaged position of the pistons. When the flanges are connected with a stationary element, the disc and flanges are held stationary in the engaged position of the pistons with the flanges.

Whereas the present invention has been described in particular relation to the drawings attached hereto, it should be understood that other and further modifications, apart from those shown or suggested herein may be made with the spirit and scope of this invention.

What is claimed is:

1. A friction apparatus adapted for installation on a rotatable shaft, and comprising hub means concentrically disposed around the shaft and secured directly thereto for rotation simultaneously therewith, a rotatable annular disc having the inner peripheral portions thereof secured directly to the hub means, a pair of annular flanges disposed outboard of the disc means and spaced slightly from the opposite sides thereof, piston means carried by the disc and operable between extended and retracted positions between the annular flanges for alternate engagement and disengagement with respect thereto, and means secured to the annular flanges for supporting thereof independent of the disc whereby the disc and annular flanges coact simultaneously in the engaged position of the piston means and act independently in the disengaged position of the piston means.

2. A friction apparatus set forth in claim 1 wherein the disc means comprises an annular rotatable disc having a plurality of circumferentially spaced bores provided therein, each of said bores being provided with said piston means therein.

3. A friction apparatus as set forth in claim 2 wherein the piston means in each of said bores comprises sleeve means secured in said bore and having the longitudinal axis thereof substantially perpendicular to the plane of the disc means, a pair of substantially identical piston members slidably disposed in said sleeve means and oppositely disposed with respect to one another, chamber means interposed between the piston members, and means operably connected with the chamber means to direct pressure fluid to and from the chamber means to reciprocate said piston members with respect to the sleeve means to provide said extended and retracted positions for the piston means.

4. A friction apparatus as set forth in claim 3 wherein the piston members each comprise a main body member slidably disposed in said sleeve means, sealing means disposed around the outer periphery of the body member and engageable with the inner periphery of the sleeve means for precluding leakage of fluid therebetween, and friction means secured to the outer face of the body member for frictional engagement with the respective annular flange means in the extended position of the piston means to provide said coaction between the annular flange means and rotatable disc means.

5. A friction apparatus set forth in claim 3 and including spring means disposed in said chamber means and interposed between said piston members, said spring means having a normal retracted position and engageable with the piston members for constantly urging the piston members in a direction toward each other within said sleeve means.

6. A friction apparatus as set forth in claim 1 wherein the rotatable disc means comprises a substantially flat annular disc member, a centrally disposed rotatable shaft means extending through said annular disc member, and the hub means comprises an outwardly extending circumferential flange member in engagement with one face of the annular disc member, annular ring means disposed against the opposite face of the annular disc member and concentrically arranged around the outer periphery of the shaft means, stud and nut means extending through the annular ring means and annular disc member and circumferential flange member for securing the disc member to the shaft for simultaneous movement therebetween.

7. A friction apparatus as set forth in claim 1 wherein the piston means comprises a plurality of complementary pairs of reciprocal piston members secured in back-to-back relation and circumferentially spaced around the rotatable disc means, chamber means interposed between each complementary pair of piston members, and means for directing pressure fluid to and from the chamber means for reciprocation of the piston members to provide said extended and retracted positions therefor.

8. A friction apparatus comprising a rotatable shaft means, hub means secured to the outer periphery of the shaft means for movement simultaneously therewith, an annular disc member concentrically disposed around the outer periphery of the shaft means and having one face disposed against the hub means, annular ring means concentrically disposed around the shaft means and disposed against the outer face of the disc member, stud means extending through the ring means and disc member and hub means for securing the disc member to the shaft for simultaneous movement therebetween, a first annular flange concentrically disposed around the outer periphery of the shaft and outboard of one side of said disc member and slightly spaced therefrom, a second substantially identical annular flange concentrically disposed around the outer periphery of the shaft and outboard of the opposite side of said disc member and slightly spaced therefrom, bearing means secured around the outer periphery of the shaft means in spaced relation with respect to the hub means, sleeve means supported by the bearing means for selective independent movement of the shaft means with respect to the sleeve means, stud means securing the sleeve means to the first and second annular flanges for simultaneous movement therebetween, said disc member being provided with at least one bore having piston means mounted therein, said piston means being extendable and retractable to provide alternate positions of engagement and disengagement with the first and second flanges to provide coaction between the shaft and sleeve means in the engaged position of the piston means and independent action therebetween in the disengaged position of the piston means.

9. A friction apparatus as set forth in claim 8 and including means cooperating between the shaft means and disc member for directing fluid pressure to and from the piston means for providing said extended and retracted positions therefor.

* * * * *